United States Patent
Greening et al.

(10) Patent No.: US 9,559,543 B2
(45) Date of Patent: Jan. 31, 2017

(54) ADAPTIVE EFFECTIVE C-RATE CHARGING OF BATTERIES

(71) Applicant: Apple Inc., Cupertino, CA (US)

(72) Inventors: Thomas C. Greening, San Jose, CA (US); Jeffrey G. Koller, Oxnard, CA (US); P. Jeffrey Ungar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/946,577

(22) Filed: Jul. 19, 2013

(65) Prior Publication Data
US 2015/0022160 A1 Jan. 22, 2015

(51) Int. Cl.
*H02J 7/00* (2006.01)
*H01M 10/42* (2006.01)
*H01M 10/44* (2006.01)
*H01M 10/48* (2006.01)

(52) U.S. Cl.
CPC .......... *H02J 7/0091* (2013.01); *H01M 10/425* (2013.01); *H01M 10/44* (2013.01); *H01M 10/48* (2013.01); *H02J 7/0077* (2013.01); *H01M 2010/4271* (2013.01)

(58) Field of Classification Search
CPC . G01R 31/3673; H01M 10/44; B60L 11/1611; H02J 7/045; H02J 7/007

USPC ............................ 320/126–128, 132, 137, 156–157,320/161–162
See application file for complete search history.

(56) References Cited

U.S. PATENT DOCUMENTS

| | | | |
|---|---|---|---|
| 6,300,763 B1* | 10/2001 | Kwok | G01R 31/3651 320/132 |
| 6,456,042 B1* | 9/2002 | Kwok | H02J 7/0029 320/128 |
| 2009/0123813 A1* | 5/2009 | Chiang et al. | 429/50 |
| 2010/0033138 A1* | 2/2010 | Alger | H02J 7/0091 320/153 |
| 2012/0200266 A1* | 8/2012 | Berkowitz et al. | 320/139 |
| 2013/0043876 A1* | 2/2013 | Liu | G01R 31/3624 324/426 |
| 2014/0030571 A1* | 1/2014 | Bhavaraju et al. | 429/106 |
| 2014/0157034 A1* | 6/2014 | Chiueh et al. | 713/340 |
| 2014/0350875 A1* | 11/2014 | Mullin et al. | 702/63 |

* cited by examiner

*Primary Examiner* — Paul Dinh
(74) *Attorney, Agent, or Firm* — Blank Rome LLP

(57) ABSTRACT

The disclosed embodiments provide a system that manages use of a battery in a portable electronic device. During operation, the system obtains a voltage of the battery and a state-of-charge of the battery. Next, the system calculates an effective C-rate of the battery using the voltage and the state-of-charge. Finally, the system uses the effective C-rate to manage a charging process for the battery.

22 Claims, 11 Drawing Sheets

ADAPTIVE EFFECTIVE C-RATE CHARGING OF BATTERIES

RELATED APPLICATIONS

The subject matter of this application is related to the subject matter in a co-pending non-provisional application by inventors Thomas C. Greening, P. Jeffrey Ungar and William C. Athas, entitled "Adaptive Surface Concentration Battery Charging," having Ser. No. 12/242,700 and filing date 30 Sep. 2008.

The subject matter of this application is also related to the subject matter in a co-pending non-provisional application by inventors P. Jeffrey Ungar, Thomas C. Greening, William C. Athas, J. Douglas Field and Richard M. Mank, entitled "Controlling Battery Charging Based on Current, Voltage and Temperature," having serial number 12/480,581 and filing date 8 Jun. 2009.

BACKGROUND

Field

The disclosed embodiments relate to batteries for portable electronic devices. More specifically, the disclosed embodiments relate to techniques for performing adaptive effective C-rate charging of batteries for portable electronic devices.

Related Art

Rechargeable lithium-ion batteries are used to provide power in a wide variety of systems, including laptop computers, cell phones, cordless power tools, and electric vehicles. A typical lithium-ion battery cell design includes a porous graphite electrode, a polymer separator impregnated with electrolyte, and a porous cobalt dioxide electrode. The details of the transport of lithium and lithium ions in and out of the electrode granules and through the material between them are complex, but the net effect is dominated by a slow diffusion process for filling one electrode with lithium and another diffusion process for removing lithium from the other.

During charging, the slow diffusion causes a transient build-up of lithium at the surface of the graphite electrode that varies directly with the charging current and a diffusion time that depends upon various environmental, design, and construction factors. If the concentration of lithium at the graphite surface reaches the saturation concentration for lithium in graphite, more lithium is prevented from entering the graphite electrode until the concentration decreases. A significant challenge in charging lithium-ion batteries is to avoid lithium surface saturation at the graphite electrode, while minimizing the charging time by charging as quickly as possible.

The conventional charging method is called the constant-current constant-voltage (CCCV) method that charges at a constant current until a fixed upper voltage limit (e.g., 4.2 V) is reached, and continues to charge by holding the voltage limit constant until the current tapers to a cutoff limit. It is common in the field to express all currents in terms of the cell capacity. For a cell with a maximum capacity $Q_{max}$ of 2500 mA·hr, a "1 C" current would be 2500 mA, where the unit C or C-rate is a capacity expressed current in units of 1/hr to be multiplied by $Q_{max}$ to get the current in amps. In the example shown in FIG. 1, the constant current setting is 0.28 C, and the constant voltage phase at 4.2 V is terminated when the current decreases to 0.05 C, indicating a fully charged battery.

The problem with the CCCV method is that it largely operates blindly as neither the current or the voltage directly correlate with the lithium surface concentration, and neither is adjusted as battery characteristics vary. Consequently, the CCCV profile must assume worst-case variability to avoid saturation, and misses the opportunity to use more current when it is possible to do so.

The Adaptive Surface Concentration Charging (ASCC) method (see U.S. Patent US2009/0259420 by inventors Thomas C. Greening, P. Jeffrey Ungar, and William C. Athas) avoids lithium surface saturation during the charging process by adapting to the dynamics of the lithium transport in a battery through closed-loop control of an estimated single electrode potential (or, equivalently, an estimate of the lithium concentration at the surface of an electrode). FIG. 2 shows an ASCC charging profile, where the battery voltage is servoed to maintain the estimated graphite electrode potential to a target voltage.

The ASCC method, while appropriately adaptive, can charge unnecessarily slowly due to the over-conservative estimate of the graphite electrode potential. The ASCC method also requires characterization of specially made three-electrode cells, typically constructed with an inserted lithium reference electrode near the separator. These three-electrode cells are difficult to manufacture without creating significant differences from the characteristics of the two-electrode cells they are intended to match.

The temperature-dependent multi-step charging method (I-V-T), described in U.S. Patent US2009/0273320 entitled "Controlling Battery Charging Based on Current, Voltage, and Temperature" by inventors P. Jeffrey Ungar, Thomas C. Greening, William C. Athas, J. Douglas Field, and Richard M. Mank, provides a method for obtaining multi-step constant-current constant-voltage charging profiles that avoid lithium surface saturation while attaining near-optimal charging times. FIG. 3 shows the multiple temperature-dependent current and voltage steps of the I-V-T charging profile, along with the graphite electrode potential indicating an unsaturated graphite surface.

Like the CCCV method, the I-V-T method reduces the charging current as the battery's maximum capacity $Q_{max}$ decreases by charging during the constant current phases with the current measured in capacity-dependent C-rates instead of amps. The I-V-T method also selects a different charging profile based on discrete ranges of the measured temperature. While the I-V-T method does not require characterization of specialized three-electrode cells like the ASCC method, three-electrode cells are useful for obtaining optimized I-V-T target parameters.

While the I-V-T method achieves near optimal charging times without lithium surface saturation for typical cells at the beginning of their life, the I-V-T method does not adapt to atypical or aged cells with diffusion times that are different from the cells used for I-V-T parameter characterization. With discrete temperature ranges for determining the charging profile, the I-V-T method also charges batteries unnecessarily slowly if near the upper end of the temperature range.

Hence, what is needed is a charging method that can charge as quickly as the I-V-T method, while preventing lithium surface saturation by dynamically adapting to changes in the diffusion time caused by temperature, age, and manufacturing variation. What also is needed is a charging method that does not require the characterization of three-electrode cells that are difficult to manufacture with characteristics statistically similar to the two-electrode cells they are intended to match.

SUMMARY

The disclosed embodiments provide a system that manages use of a battery in a portable electronic device. During operation, the system obtains a voltage of the battery and a state-of-charge of the battery. Next, the system calculates an effective C-rate of the battery using the voltage and the state-of-charge. Finally, the system uses the effective C-rate to manage a charging process for the battery.

In some embodiments, calculating the effective C-rate of the battery using the voltage and the state-of-charge involves obtaining a set of constant-current curves for a characterized behavior of the battery, and interpolating the effective C-rate for the voltage and the state-of-charge from the set of constant-current curves.

In some embodiments, the set of constant-current curves includes one or more charge curves and/or one or more discharge curves.

In some embodiments, the characterized behavior of the battery is associated with at least one of a temperature and an age. For example, the set of constant-current curves may be based on a fresh battery at 25° C.

In some embodiments, the charging process for the battery is associated with a charging current and a charging voltage.

In some embodiments, using the effective C-rate to manage the charging process involves servoing the effective C-rate to a target C-rate of the battery, and after the voltage reaches a target voltage, servoing the voltage to a target voltage.

In some embodiments, using the effective C-rate to manage the charging process further involves reapplying the servo of the effective C-rate to the target C-rate after the effective C-rate reaches a C-rate limit during application of the constant charging voltage.

In some embodiments, using the effective C-rate to manage the charging process further involves terminating charging of the battery after the effective C-rate has dropped below a charge-termination limit for a pre-specified period.

BRIEF DESCRIPTION OF THE FIGURES

In the figures, like reference numerals refer to the same figure elements.

DETAILED DESCRIPTION

Figure 1:
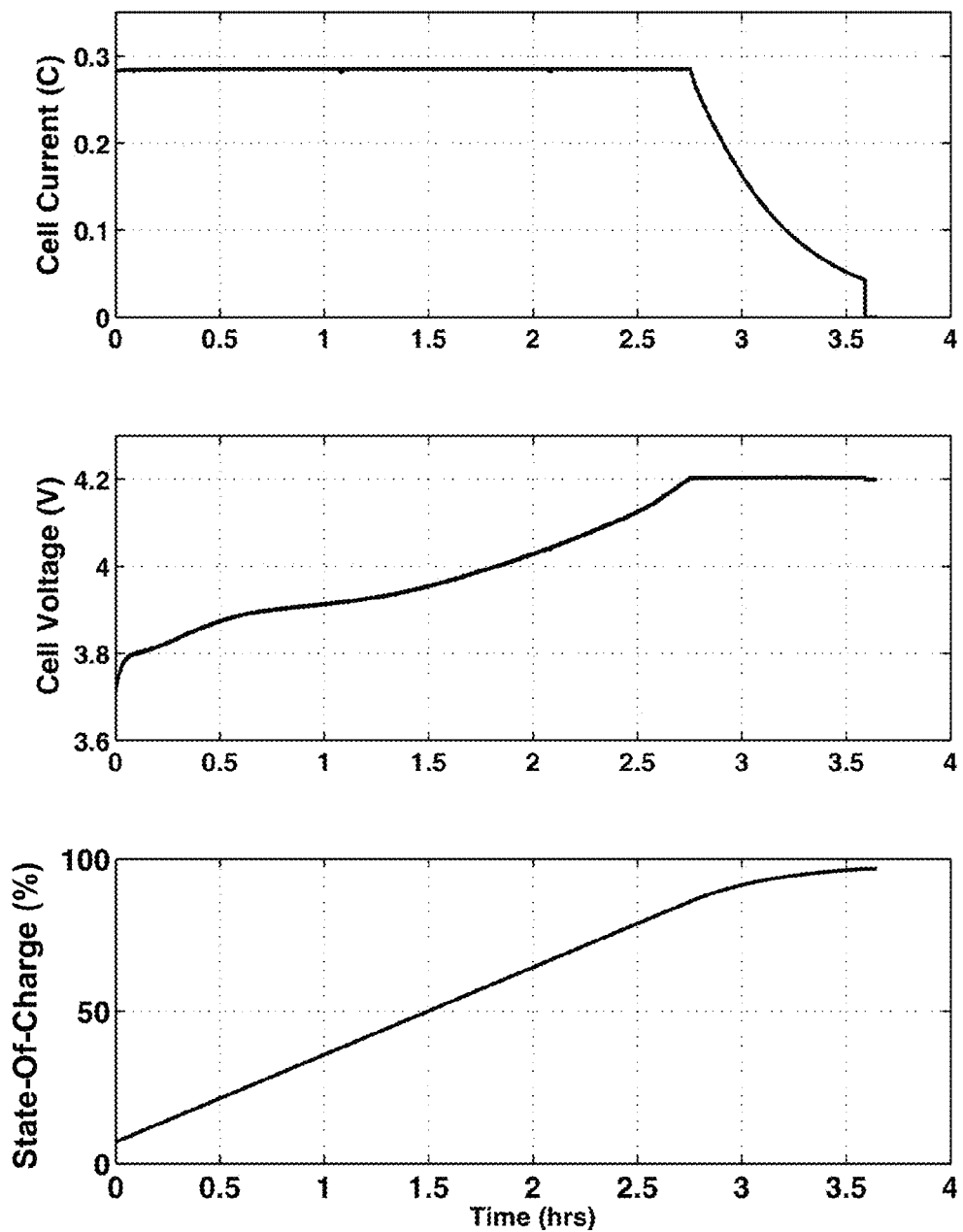
FIG. 1 shows a constant-current constant-voltage (CCCV) charging profile in accordance with the disclosed embodiments.
Figure 2:
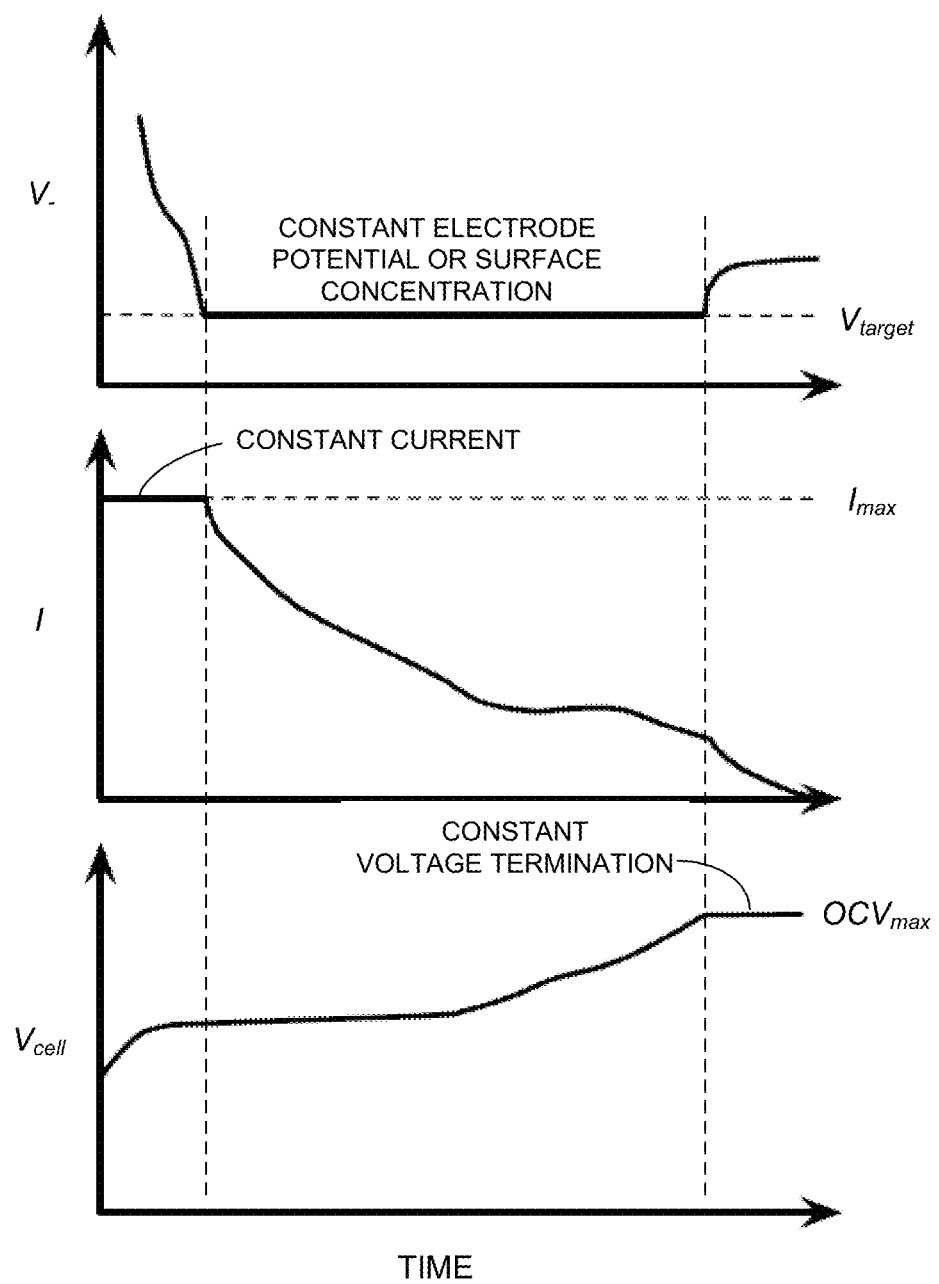
FIG. 2 shows an Adaptive Surface Concentration Charging (ASCC) profile in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for managing use of a battery in a portable electronic device. The battery may include one or more cells in a parallel and/or series configuration and supply power to a mobile phone, laptop computer, portable media player, tablet computer, and/or other battery-powered electronic device. For example, the battery may correspond to a lithium-ion battery and/or lithium-polymer battery.

More specifically, the disclosed embodiments provide a method and system for performing adaptive effective C-rate charging (AECC) of the battery. The AECC method is similar to the I-V-T charging method with multiple constant-current constant-voltage steps, but instead of controlling a measured current, the AECC method controls an effective C-rate to the target C-rate during the constant current phases, providing an adaptability to temperature, aging, and cell-to-cell manufacturing variation that prevents lithium surface saturation and extends the life of the battery.

The effective C-rate for each bank in a battery pack $C_{eff,b}$ is calculated from the bank's state-of-charge $q_b$ and the bank voltage $V_b$, and corresponds to the constant charge or discharge current of a typical un-aged battery at 25° C. with the same state-of-charge and bank voltage.

The state-of-charge of a battery is defined as the fraction of remaining charge in a battery between a top voltage at rest (e.g., 4.2 V at 25° C.) and a bottom voltage at rest (e.g., 3.0 V at 25° C.). Typically, the state-of-charge q is calculated as the change in the coulomb count ΔQ measured by a sense resistor divided by the maximum capacity of the battery $Q_{max}$ since the state-of-charge at the last rest measurement a $q_{rest}$.

$$q = q_{rest} + \frac{\Delta Q}{Q_{max}} \quad (1)$$

For a fully relaxed battery cell, a pre-characterized look up table can be used to correlate the open circuit voltage to the battery's state-of-charge. The coulomb count ΔQ is typically measured as the time integrated current measured by the battery since the last rest measurement. The maximum battery capacity $Q_{max}$ is typically measured by the ratio of the coulomb count between two separated rest measurements.

$$Q_{max} = \frac{\Delta Q_{AB}}{q_{rest,A} - q_{rest,B}} \quad (2)$$

Figure 4:
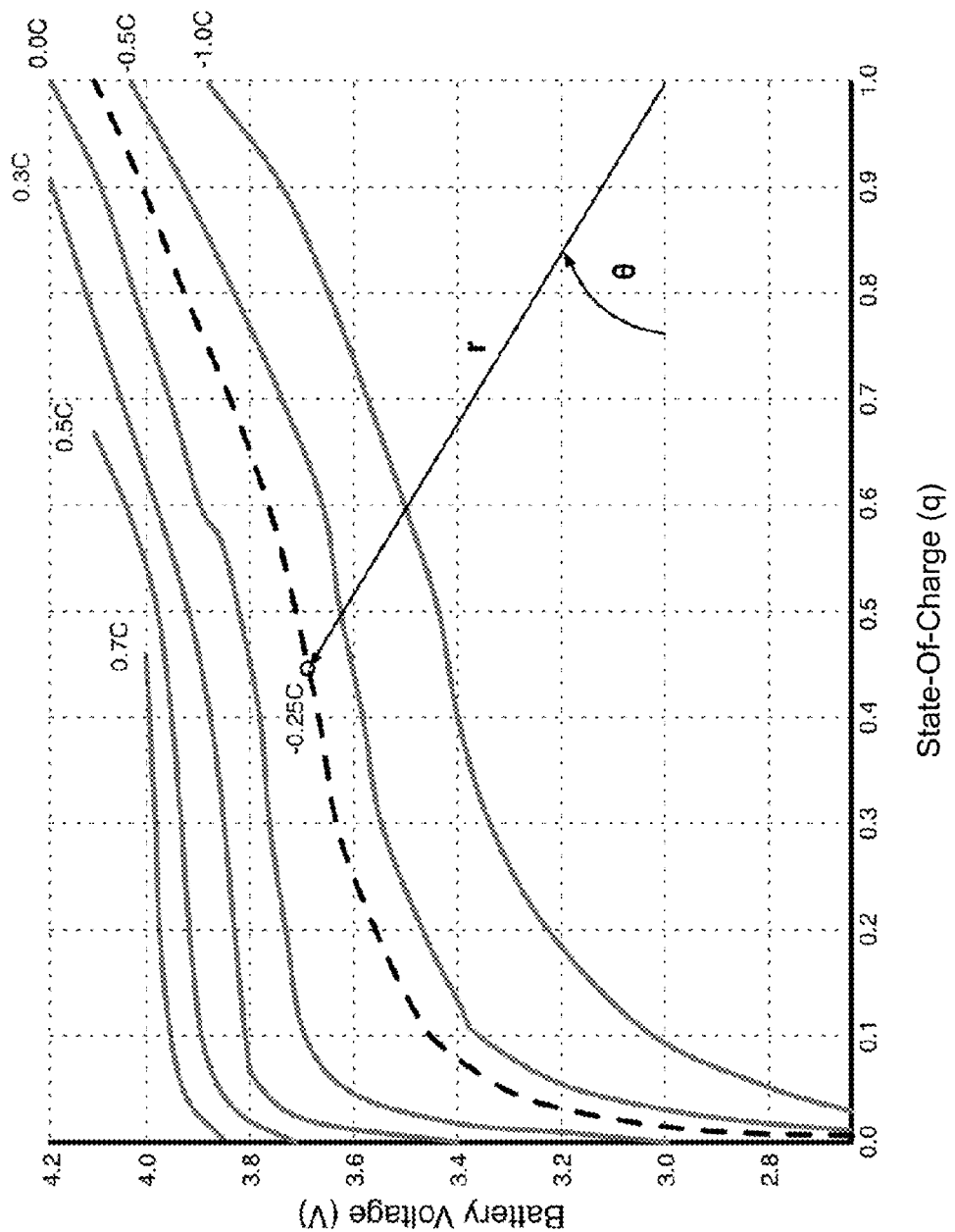
FIG. 4 shows the interpolation of a constant-current curve from a set of constant-current curves in accordance with the disclosed embodiments.

The calculation of the effective C-rate depends on pre-characterized constant current charge and discharge curves for a typical battery cell at 25° C. FIG. 4 shows the pre-characterized constant-current curves for six different C-rates plotted as a function of the voltage V and state-of-charge q.

In addition to the measured constant-current curves, one more curve at the extreme point (V=3.0 V and q=1.0) is available. The C-rate of this curve is calculated as the linear interpolation along the q=1.0 axis. The corresponding C-rate for this extreme C-rate curve is called $C_{max}$ and for the data in FIG. 4 has the value of 3.74 C.

The effective C-rate is found by using the pre-characterized constant-current curves to find which interpolated constant-current curve (dashed curve at −0.25 C in FIG. 4) intersects the measured bank voltage $V_b$ and state-of-charge $q_b$ (shown as the circle at $V_b$=3.7 V and $q_b$=0.45).

Interpolation by holding q fixed and interpolating in the V direction can be problematic at low q values because the curves are nearly vertical. Similarly, interpolation by holding V fixed and interpolating in the q direction is problematic in regions where the curves are nearly horizontal.

An interpolation method that works well transforms the constant C-rate curves into polar coordinates centered at $V_b$=3.0 V and $q_b$=1.0. The voltage $V_b$ is first scaled to variable y that ranges from 0 to 1 as the voltage ranges from 3.0 to 4.2 V.

$$y = \frac{V_b - 3.0}{1.2} \quad (3)$$

The state-of-charge $q_b$ is transformed as the distance x from q=1.0.

$$x = 1.0 - q_b \quad (4)$$

The polar coordinates $r_b$ and $\theta_b$ for the measured voltage $V_b$ and state-of-charge $q_b$ are given by:

$$r_b = \sqrt{x^2 + y^2} \quad (5)$$

and $$\theta_b = \arctan\left(\frac{y}{x}\right). \quad (6)$$

For the exemplary point given in FIG. 4 with a voltage $V_b$ of 3.7 V and a state-of-charge $q_b$ of 0.45, the polar coordinates are $r_b$=0.80 and $\theta_b$=46.7°.

The pre-characterized constant C-rate curves are stored in polar coordinate form, and a simple multi-step linear interpolation method is sufficient for determining the effective C-rate. First, the r values of each curve are linearly interpolated at the measured angle $\theta_b$. The r values at $\theta_b$ of the two pre-characterized curves ($r_1$ and $r_2$) that surround the measured $r_b$ are then used to linearly interpolate the C-rate values of the two curves ($C_{rate,1}$ and $C_{rate,2}$) to calculate the effective C-rate $$C_{eff,b} = \frac{(C_{rate,1} - C_{rate,2}) \cdot (r_b - r_2)}{r_1 - r_2} + C_{rate,2} \quad (7)$$

For the given point in FIG. 4, the effective C-rate $C_{eff,b}$ interpolated from the constant-current curves is −0.25 C.

The effective C-rate may be interpreted as the constant charge or discharge current required by a typical cell at 25° C. in order to have the same voltage $V_b$ and state-of-charge $q_b$ as the measured cell. In the case where the measured cell is a typical cell at 25° C. and has been discharging or charging at a constant current, the effective C-rate will be equal to the measured C-rate. By specifying the effective current as a C-rate, the charging current proportionally decreases as the maximum capacity $Q_{max}$ decreases with age.

Figure 5:
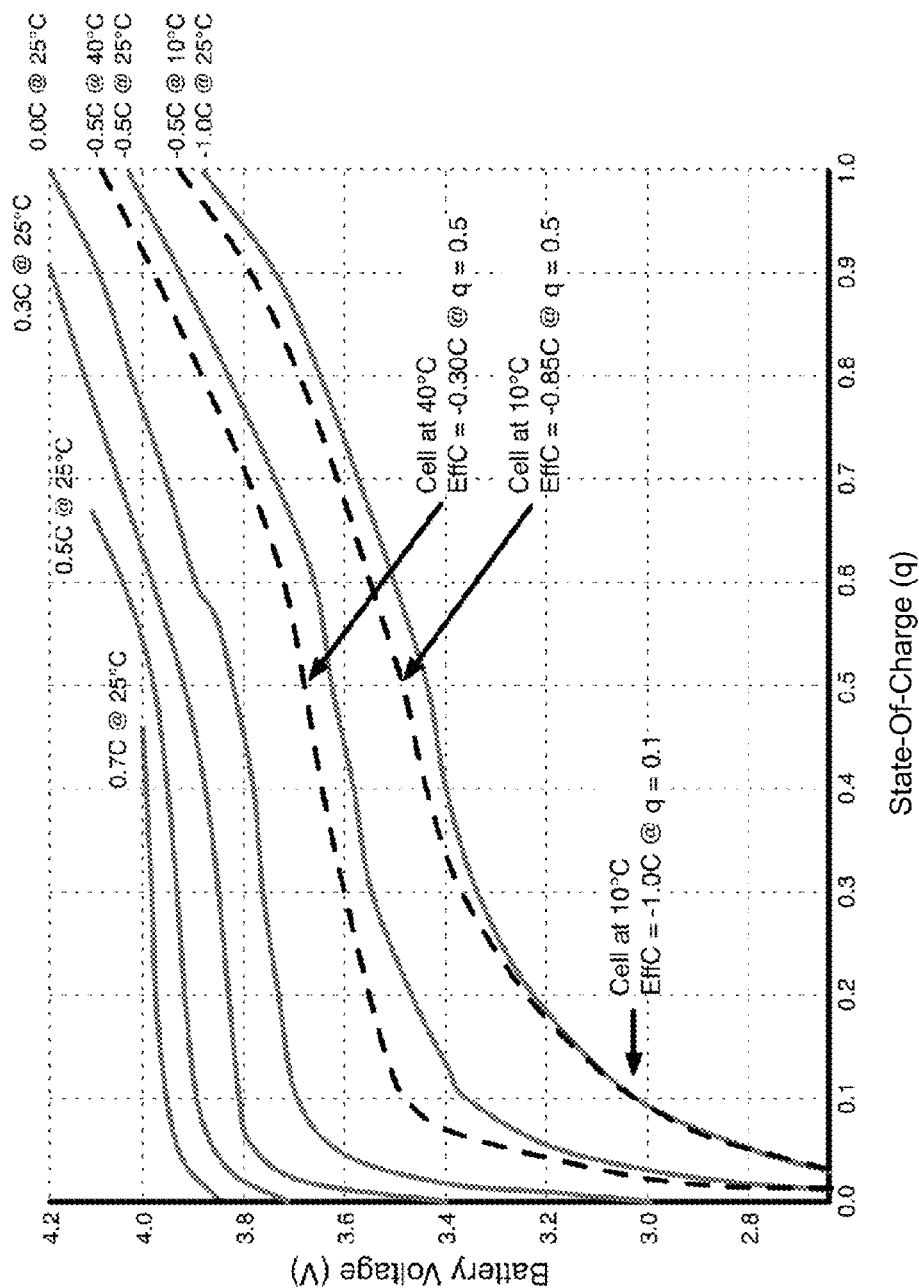
FIG. 5 shows a set of constant C-rate curves at different temperatures in accordance with the disclosed embodiments.

In addition to adapting to capacity, the effective C-rate also adapts to changes in temperature. For instance, constant-current curves at other temperatures look very similar to the pre-characterized curves at 25° C., but at different currents. FIG. 5 shows the pre-characterized constant-current curves at 25° C. along with −0.5 C discharges at 10° C. and 40° C. The constant curves at the different temperatures look very similar to 25° C. discharge curves at different currents. Lower temperatures slow diffusion and colder constant-current curves shift away from the 0.0 C curve at 25° C. Higher temperatures speed up diffusion and warmer constant-current curves shift closer to the 0.0 C curve at 25° C. For the example in FIG. 5, the equivalent C-rate for the constant −0.5 C discharge at 10° C. at a state-of-charge of 0.5 is about −0.85 C. The equivalent C-rate for the constant −0.5 C discharge at 40° C. at a state-of-charge of 0.5 is about −0.3 C.

Figure 6:
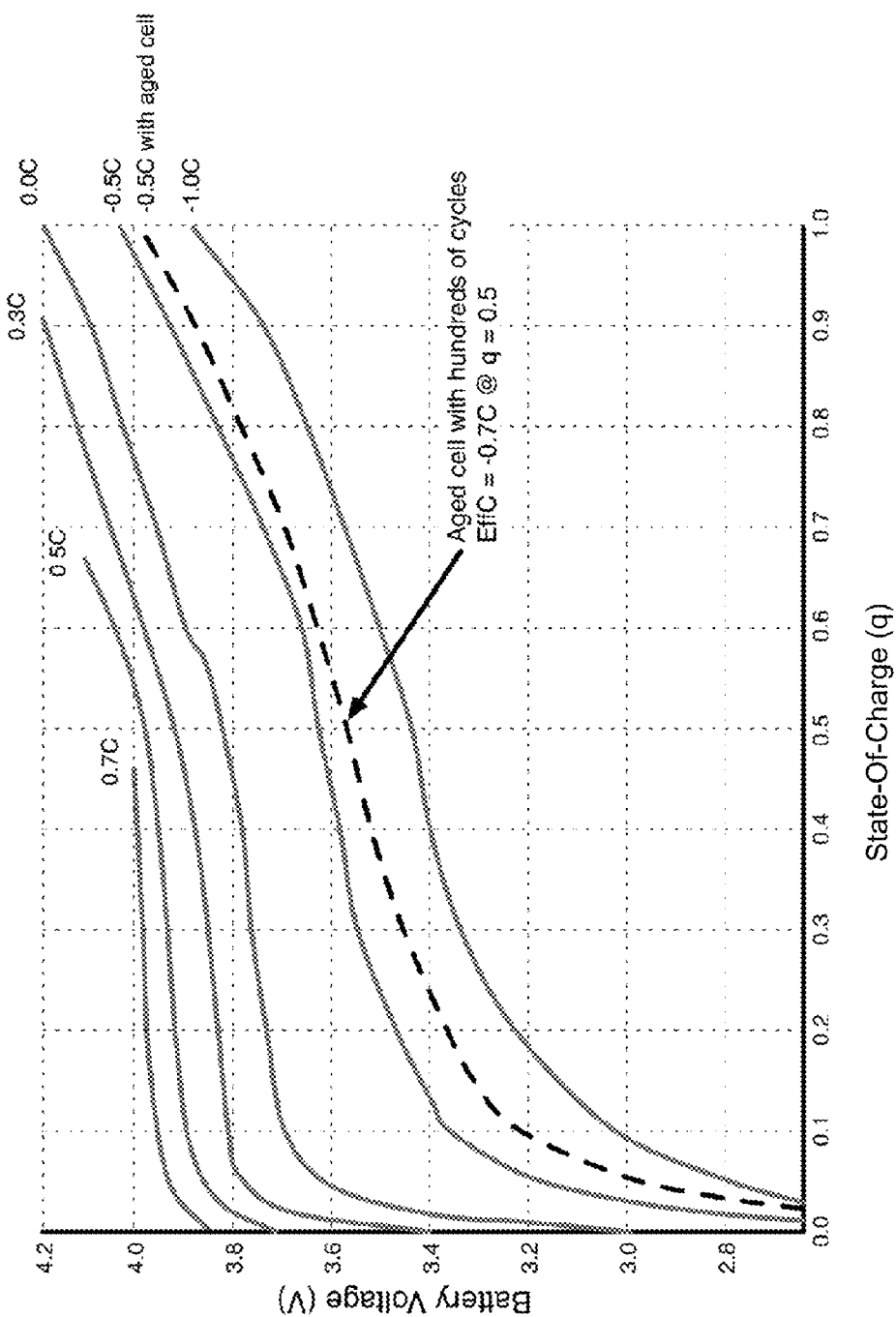
FIG. 6 shows a set of constant C-rate curves at different life cycles in accordance with the disclosed embodiments.

Similarly, aged cells also show slowed diffusion much like a fresh cell at a colder temperature. FIG. 6 shows a constant current discharge at −0.5 C at 25° C. for a cell that has experienced hundreds of full capacity discharge cycles. The equivalent current for this aged cell is about −0.70 C at a state-of-charge of 0.5.

During manufacturing, cell-to-cell differences produce variations in the diffusion rates for otherwise identical cells. Consequently, even fresh cells at 25° C. can show variance from the pre-characterized constant-current curves, and the calculation of their effective C-rates can differ from the measured C-rates.

Notice that not only can the effective C-rate be very different from the measured C-rate, but that the effective C-rate can also vary even if the real current is constant, or vice versa. For instance, as shown in FIG. 5, at lower states-of-charge the equivalent C-rate for the −0.5 C constant current discharge at 10° C. moves from −0.85 C to −1.0 C.

Figure 3:
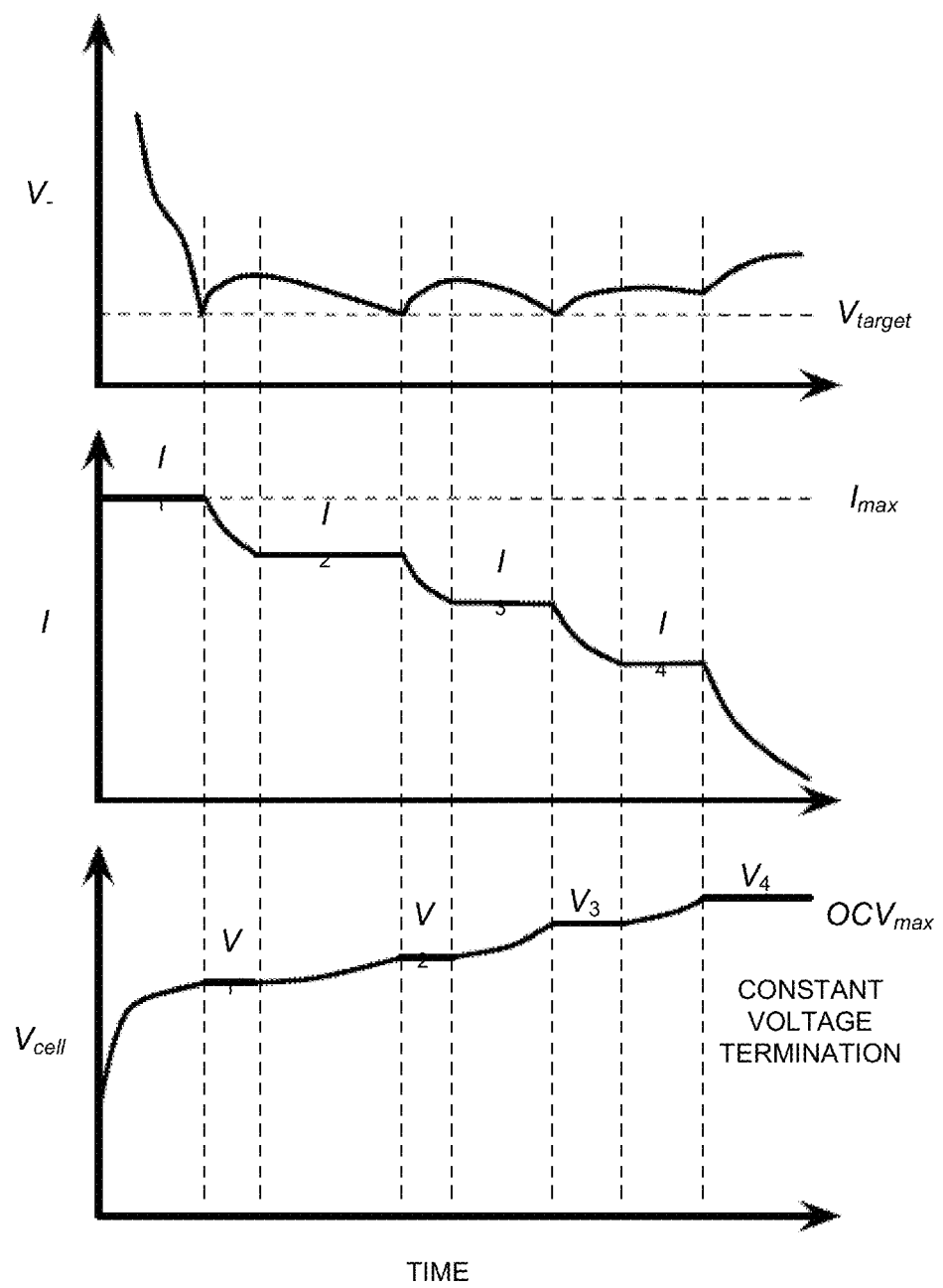
FIG. 3 shows a discrete I-V-T charging profile in accordance with the disclosed embodiments.

When charging, the effective C-rate becomes a practical metric that dynamically changes with variations in temperature, aging, and cell-to-cell manufacturing differences. The Adaptive Effective C-rate Charging (AECC) method is essentially the same as the I-V-T method, shown in FIG. 3, except that the effective C-rate instead of the measured C-rate is servoed to the target C-rate during the constant-current phases of charging. Therefore, for a typical cell at 25° C., there is no difference between I-V-T and AECC charging, because there is no difference between the effective C-rate and the measured C-rate.

Charging by controlling the effective C-rate to a target C-rate brings adaptability that is missing from the I-V-T charging method. In addition, the constant-current constant-voltage steps only need to be specified at 25° C., as the temperature dependence is taken into account in the temperature-dependent effective C-rate and not in the set points.

Figure 7:
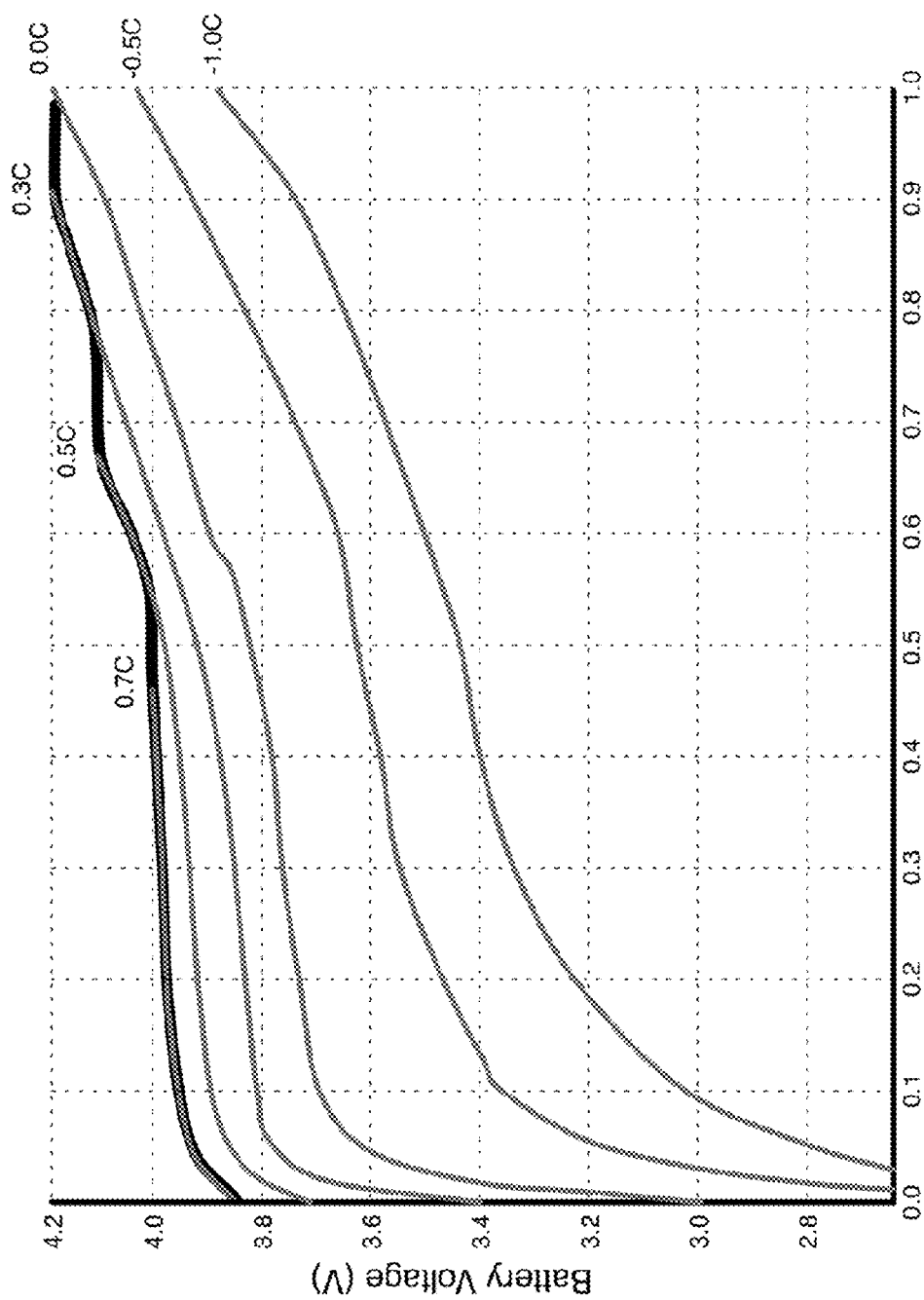
FIG. 7 shows an adaptive effective C-rate charging (AECC) profile in accordance with the disclosed embodiments.

For instance, the AECC profile in FIG. 7 is comprised of the following three constant-effective C-rate/constant-voltage pairs: 0.7 C/4.0 V, 0.5 C/4.1 V, and 0.3 C/4.2 V. In this scenario, an empty battery would charge at a constant-effective C-rate of 0.7 C until reaching 4.0 V. The battery voltage would then be held at 4.0 V until the current dropped to the next target pair at an effective C-rate of 0.5 C. The battery then charges at a constant-effective C-rate of 0.5 C until reaching 4.1 V and holds at 4.1 V until the current drops to an effective C-rate of 0.3 C. The battery then charges at a constant-effective C-rate of 0.3 C until reaching 4.2 V and holds at 4.2 V until the battery is fully charged.

A fully charged battery is identified when the current has dropped below an effective C-rate, such as 0.05 C, near 4.2 V for a specified period of time. By specifying a charge termination current in terms of the effective C-rate, the battery will always be at the same state-of-charge when fully charged, regardless of the battery diffusion characteristics.

The AECC charging profile versus state-of-charge always follows the path shown in FIG. 7 that traverses at a constant-effective C-rate until reaching a voltage target and then traverses at a constant voltage until the effective C-rate drops to the next constant C-rate curve. The charging profile in time space, however, depends greatly upon how the effective C-rate has adapted to the variations caused by temperature, aging, and cell-to-cell manufacturing variation, as shown in FIG. 8 with a cell at 25° C. and a cell at 10° C.

Figure 8:
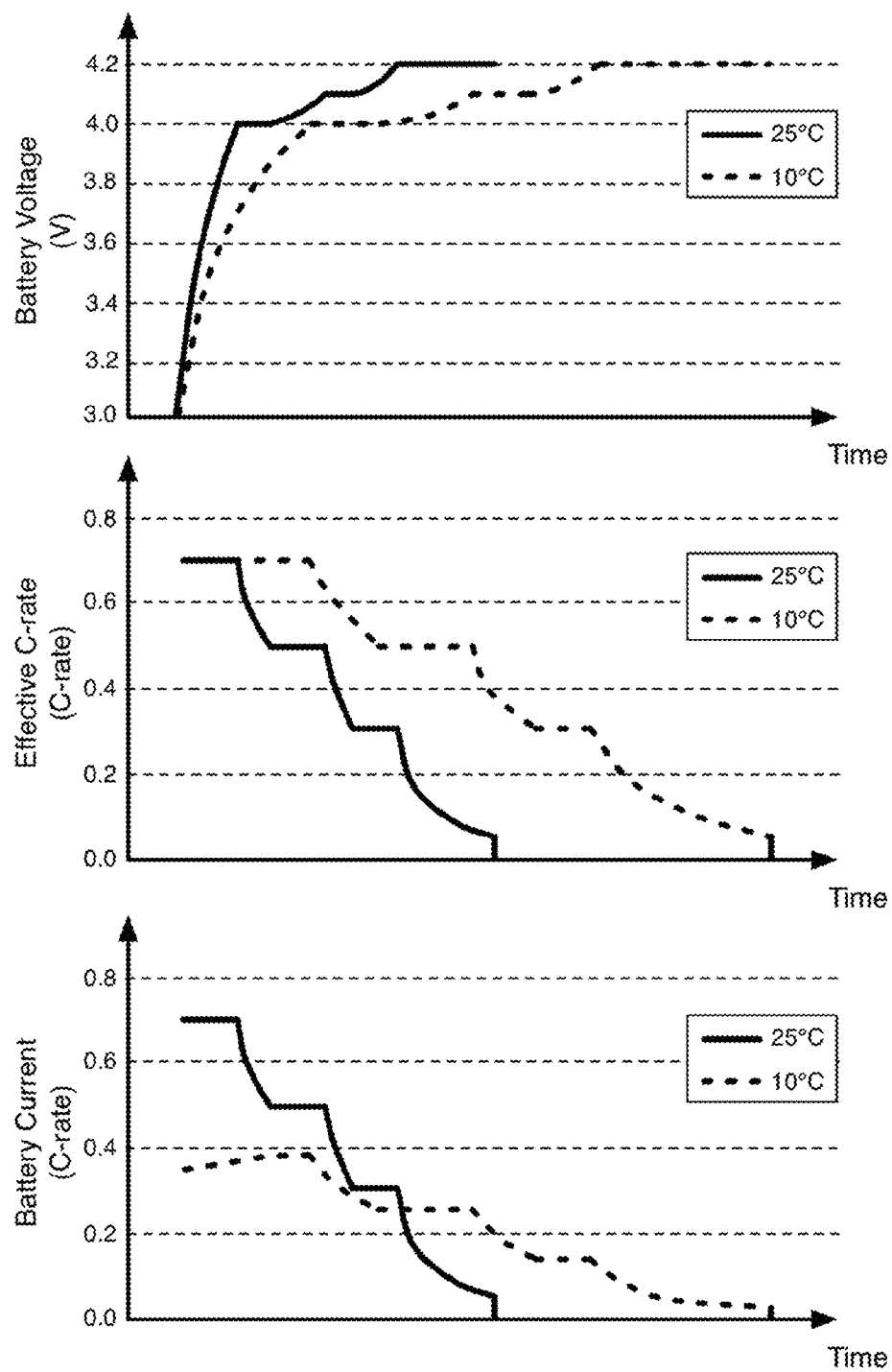
FIG. 8 shows an exemplary AECC charging of a battery over time in accordance with the disclosed embodiments.

The top plot of FIG. 8 shows the battery voltage as a function of time, where the constant voltage steps at 4.0 V, 4.1 V and 4.2 V can be seen. The middle plot shows the effective C-rate as a function of time showing the constant-effective C-rate steps at 0.7 C, 0.5 C, and 0.3 C and the fully charged termination current at an effective C-rate of 0.05 C. The bottom plot shows the measured C-rate as a function of time. For the typical cell at 25° C., there is no difference between the effective C-rate and the measured C-rate. For the cell at 10° C., however, the measured C-rate is significantly smaller than the effective C-rate. Notice, as well, that during the constant-effective C-rate phase at 0.7 C, the measured C-rate for the cell at 10° C. is not constant and increases from about 0.35 C to 0.4 C as the state-of-charge increases from 0.0 to 0.45. There is no requirement or expectation that the measured C-rate is constant, if the effective C-rate is being held constant.

Another way to view AECC charging is that, instead of a charging method based on voltage and current, AECC charging is based on voltage and state-of-charge always following the same trajectory in the voltage versus state-of-charge space, as seen in FIG. 7. Consequently, AECC charging naturally adapts to changes in the diffusion rate caused by temperature, aging, and cell-to-cell manufacturing variation. All that is required is that the prescribed charging trajectory in the voltage versus state-of-charge space does not cause saturation for the typical cell at 25° C. If the prescribed trajectory avoids lithium surface saturation, then lithium surface saturation will be avoided with the AECC method even as the cell's diffusion rate changes.

Charging based upon voltage and state-of-charge is also the premise of the ASCC charging method. The only difference between the two methods is the chosen trajectory in the voltage versus state-of-charge space. For AECC, the trajectory is based upon a tested I-V-T profile of typical un-aged cells at 25° C., while the ASCC trajectory is based upon the open circuit positive electrode potential relative to a lithium reference. While the ASCC method is designed to select a safe trajectory that avoids lithium surface saturation, it is often overly conservative when compared to the experimentally verified I-V-T trajectory. Consequently, the AECC charging method has the adaptive benefits of the ASCC method with the faster charging time of the non-adaptive I-V-T method.

In summary, the Adaptive Effective C-rate Charging (AECC) method adapts the charging profile as a battery's capacity and diffusion rate change due to age, temperature, or cell-to-cell manufacturing variation preventing lithium surface saturation at the graphite electrode. Preventing lithium saturation is a key component in extending the lifetime of a battery. In addition, the AECC method does not depend upon characterization of three-electrode cells that are difficult to manufacture with characteristics statistically equivalent to the two-electrode cells they are intended to match.

Figure 9:
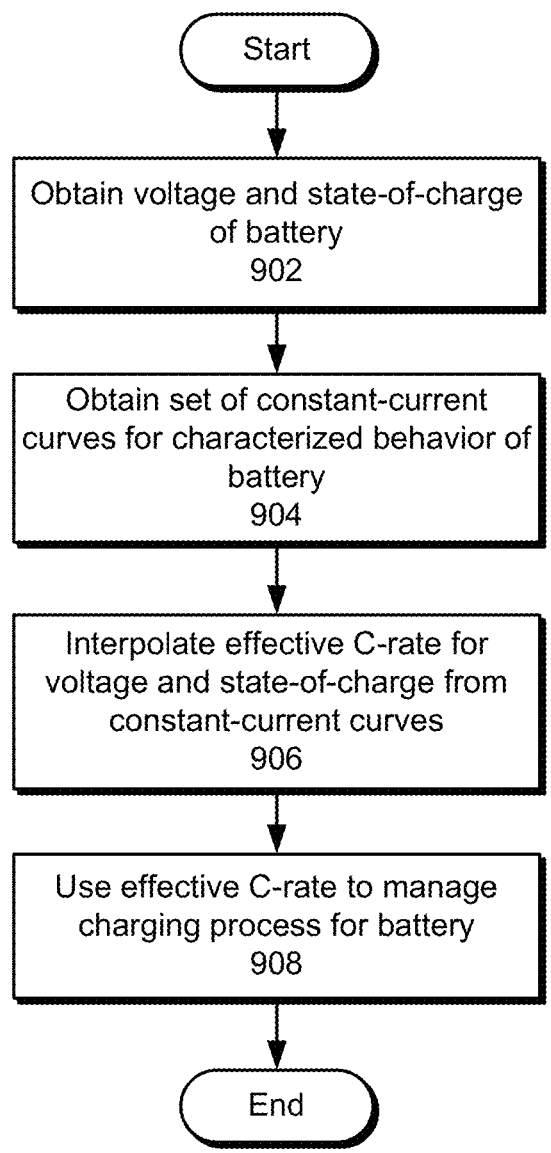
FIG. 9 shows a flowchart illustrating the process of managing use of a battery in a portable electronic device in accordance with the disclosed embodiments.

FIG. 9 shows a flowchart illustrating the process of managing use of a battery in a portable electronic device in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a voltage and state-of-charge of the battery are obtained (operation 902). The voltage may be measured from the battery, and the state-of-charge may be calculated using a coulomb-counting technique. Next, an effective C-rate of the battery is calculated using the voltage and the state-of-charge.

In particular, a set of constant-current curves for a characterized behavior of the battery are obtained (operation 904), and the effective C-rate for the voltage and state-of-charge is interpolated from the constant-current curves (operation 906). For example, one or more charge and/or discharge curves for a given temperature (e.g., 25° C.) and/or age (e.g., fresh) of the battery may be parameterized, and the battery's voltage and state-of-charge is mapped to a "point" on a parameterized charge and/or discharge curve for a certain C-rate of the battery at the given temperature and/or age.

The effective C-rate is then used to manage a charging process for the battery (operation 908). For example, the effective C-rate may be used to adjust a charging voltage and/or charging current for the battery. Using effective C-rates to manage charging processes for batteries is discussed in further detail below with respect to FIG. 10.

Figure 10:
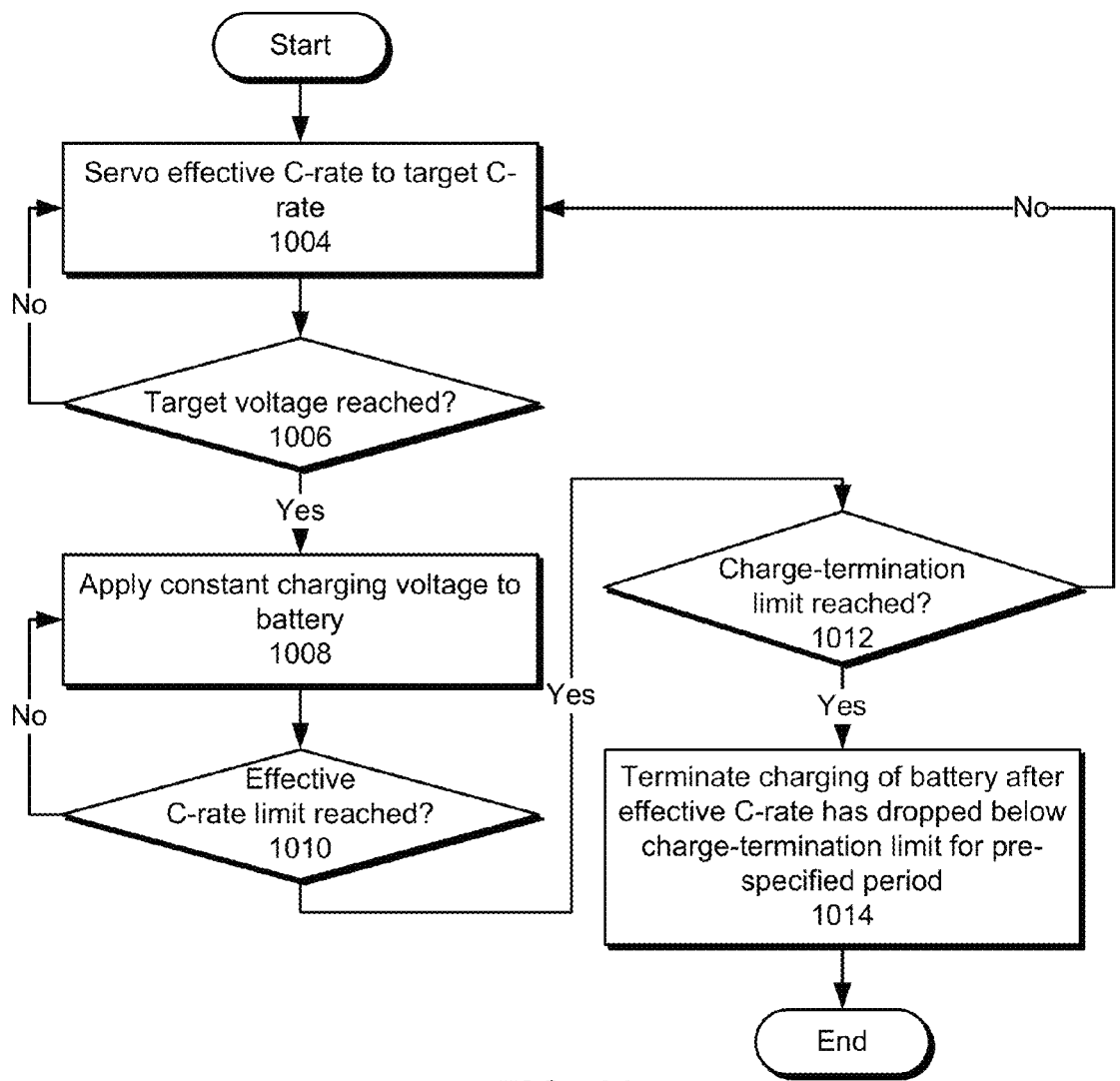
FIG. 10 shows a flowchart illustrating a charging process for a battery in accordance with the disclosed embodiments.

FIG. 10 shows a flowchart illustrating a charging process for a battery in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

First, a charging current or voltage applied to the battery is increased or decreased to servo the effective C-rate to the target C-rate (operation 1004). In other words, the charging current or voltage may be applied in a way that maintains a target value of the effective C-rate during the constant effective C-rate charging phase of the battery.

A target voltage may be reached (operation 1006) during the constant effective C-rate charging of the battery. The target voltage may represent a maximum lithium surface concentration for a graphite negative electrode of the battery. If the target voltage is not reached, the effective C-rate may continue to be servoed to the target C-rate (operation 1004) during application of the constant effective C-rate charging phase.

If the target voltage is reached, a charging current or voltage applied to the battery is increased or decreased to servo the measured voltage to the target voltage (operation 1008). The constant charging voltage may increase the voltage of the negative electrode and decrease the effective C-rate of the battery until the effective C-rate reaches a C-rate limit (operation 1010). If the C-rate limit is not reached, the constant charging voltage may continue to be applied (operation 1008) to the battery.

Once the C-rate limit is reached, a charge-termination limit of the battery may also be reached (operation 1012) by the effective C-rate. The charge-termination limit may be the effective C-rate at which charging of the battery concludes. If the charge-termination limit is not reached, charging of the battery may proceed by alternating between constant C-rate charging of the battery (operations 1004-1006) and constant-voltage charging of the battery (operations 1008-1012). Once the charge-termination limit is reached, charging of the battery is terminated after the effective C-rate has dropped below the charge-termination limit for a pre-specified period (operation 1014). For example, the battery may be fully charged when the effective C-rate drops below 0.05 C for a number of minutes.

Figure 11:
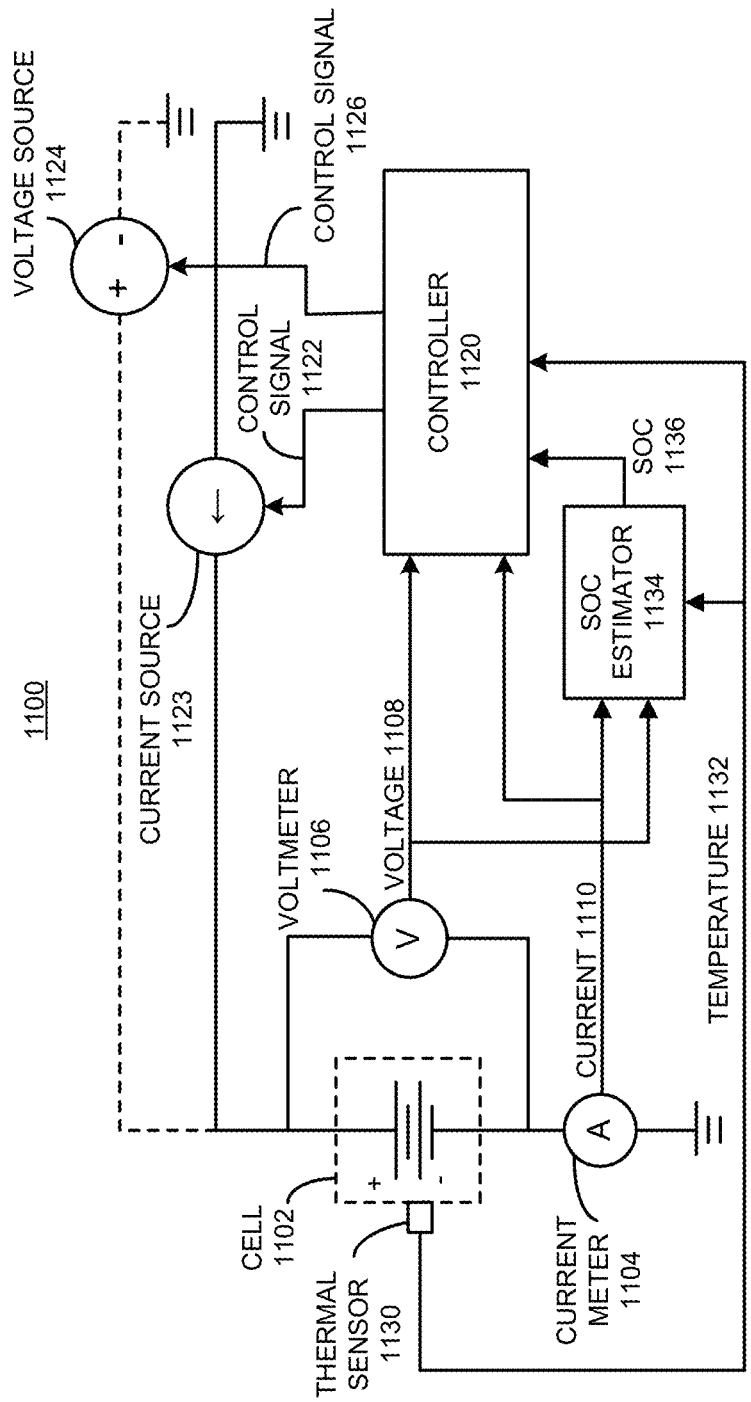
FIG. 11 shows a system for managing use of a battery in a portable electronic device in accordance with the disclosed embodiments.

FIG. 11 shows a system for managing use of a battery 1100 in a portable electronic device in accordance with the disclosed embodiments. Battery 1100 includes a battery cell 1102. It also includes a current meter (current sensor) 1104, which measures a charging current applied to cell 1102, and a voltmeter (voltage sensor) 1106, which measures a voltage across cell 1102. Battery 1100 also includes a thermal sensor 1130, which measures the temperature of battery cell 1102. (Note that numerous possible designs for current meters, voltmeters and thermal sensors are well known in the art.)

Rechargeable battery 1100 also includes a current source 1123, which provides a controllable constant charging current (with a varying voltage), or alternatively, a voltage source 1124, which provides a controllable constant charging voltage (with a varying current).

The charging process is controlled by a controller 1120, which receives a voltage signal 1108 from voltmeter 1106, a current signal 1110 from current meter 1104, a temperature signal 1132 from thermal sensor 1130, and/or a state-of-charge (SOC) value 1136 from a SOC estimator 1134. These inputs are used to generate a control signal 1122 for current source 1123, or alternatively, a control signal 1126 for voltage source 1124.

During operation, SOC estimator 1134 receives a voltage 1108 from voltmeter 1106, a current from current meter 1104 and/or a temperature from thermal sensor 1130 and outputs SOC value 1136.

Note that controller 1120 can be implemented using either a combination of hardware and software or purely hardware. In one embodiment, controller 1120 is implemented using a microcontroller, which includes a microprocessor that executes instructions that control the charging process.

In one or more embodiments, the system of FIG. 11 includes functionality to charge battery 1100 using AECC. The system may include a monitoring apparatus that obtains voltage 1108 and SOC 1136 and calculates an effective C-rate of the battery using voltage 1108, SOC 1136, and a set of constant-current curves for a characterized behavior of battery 1100. The system may also include a management apparatus that uses the effective C-rate to manage a charging process for battery 1100. For example, the management apparatus (e.g., controller 1120) may use the effective C-rate to generate control signal 1122 and control signal 1126 during charging of battery 1100.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing use of a battery in a portable electronic device, comprising:
    measuring a voltage of a battery using a voltage sensor;
    obtaining a state-of-charge of the battery;
    interpolating, using a computer, pre-characterized constant-current curves of the battery to determine a constant-current curve which contains the measured voltage and the obtained state of charge;
    determining a present effective C-rate corresponding to the determined constant-current curve; and
    varying a charging current applied to the battery to control the effective C-rate toward a target C-rate of the battery until a target voltage of the battery is reached.

2. The method of claim 1, wherein each of the pre-characterized constant-current curves of the battery is based on a characterized behavior of the battery.

3. The method of claim 2, wherein one or more of the pre-characterized constant-current curves comprises at least one of:
    one or more charge curves; or
    one or more discharge curves.

4. The method of claim 2, wherein the characterized behavior of the battery is associated with at least one of:
    a temperature of the battery; or
    an age of the battery.

5. The method of claim 1, further comprising:
    after the voltage of the battery reaches the target voltage, charging the battery using a constant charging voltage until the effective C-rate reaches a C-rate limit.

6. The method of claim 5, further comprising:
    in response to the effective C-rate being equal to the C-rate limit, further charging the battery with the constant charging voltage to drive the effective C-rate to the target C-rate.

7. The method of claim 5, further comprising:
terminating the charging of the battery after the effective C-rate has dropped below a charge-termination limit for a pre-specified period, the charge-termination limit being lower than the C-rate limit.

8. The method of claim 1, wherein at least one of the pre-characterized constant-current curves is implemented in polar format.

9. A system for managing use of a battery in a portable electronic device, comprising:
a monitoring apparatus configured to:
measure a voltage of the battery;
obtain a state-of-charge of the battery;
interpolate, using a computer, pre-characterized constant-current curves of the battery to determine a constant-current curve which contains the measured voltage and the obtained state of charge;
determine a present effective C-rate corresponding to the determined constant-current curve; and
a management apparatus configured to:
vary a charging current applied to the battery to control the effective C-rate toward a target C-rate of the battery until a target voltage of the battery is reached.

10. The system of claim 9, wherein each of the pre-characterized constant-current curves of the battery is based on a characterized behavior of the battery.

11. The system of claim 10, wherein the characterized behavior of the battery is associated with at least one of:
a temperature of the battery; or
an age of the battery.

12. The system of claim 9, wherein the management apparatus is further configured to:
after the voltage of the battery reaches the target voltage, charge the battery using a constant charging voltage until the effective C-rate reaches a C-rate limit.

13. The system of claim 12, wherein the management apparatus is further configured to:
in response to the effective C-rate being equal to the C-rate limit, further charge the battery with the constant charging voltage to drive the effective C-rate to the target C-rate.

14. The system of claim 12, wherein the management apparatus is further configured to:
terminate charging of the battery after the effective C-rate has dropped below a charge-termination limit for a pre-specified period, the charge-termination limit being lower than the C-rate limit.

15. A non-transitory computer-readable medium storing instructions that, when executed by a computer, cause the computer to:
measure a voltage of the battery;
obtain a state-of-charge of the battery;
interpolate pre-characterized constant-current curves of the battery to determine a constant-current curve which contains the measured voltage and the obtained state of charge;
determine a present effective C-rate corresponding to the determined constant-current curve; and
vary a charging current applied to the battery to control the effective C-rate toward a target C-rate of the battery until a target voltage of the battery is reached.

16. The non-transitory computer-readable medium of claim 15, wherein each of the pre-characterized constant-current curves of the battery is based on a characterized behavior of the battery.

17. The non-transitory computer-readable medium of claim 16, wherein one or more of the pre-characterized constant-current curves comprises at least one of:
one or more charge curves; or
one or more discharge curves.

18. The non-transitory computer-readable medium of claim 15, wherein the instructions further comprise instructions to cause the computer to:
after the voltage of the battery reaches the target voltage, charge the battery using a constant charging voltage until the effective C-rate reaches a C-rate limit.

19. The non-transitory computer-readable medium of claim 18, wherein the instructions further comprise instructions to cause the computer to:
in response to the effective C-rate being equal to the C-rate limit, further charge the battery with the constant charging voltage to drive the effective C-rate to the target C-rate.

20. The non-transitory computer-readable medium of claim 18, the instructions further comprise instructions to cause the computer to:
terminate the charging of the battery after the effective C-rate has dropped below a charge-termination limit for a pre-specified period, the charge-termination limit being lower than the C-rate limit.

21. A method for managing use of a battery in a portable electronic device, comprising:
measuring a first voltage of a battery using a voltage sensor;
obtaining a state-of-charge of the battery;
interpolating, using a computer, a plurality of pre-characterized constant-current curves of the battery to determine a constant-current curve associated with the first voltage and the obtained state-of-charge;
determining a present effective C-rate of the battery corresponding to the determined constant-current curve, the effective C-rate of the battery indicative of a rate at which the battery being charged and corresponding to the first voltage;
varying a charging current applied to the battery to control the effective C-rate of the battery toward a first target C-rate of the battery, the first target C-rate of the battery corresponding to a second voltage; and
in response to the effective C-rate being equal to the first target C-rate, charging the battery using a constant charging voltage until the effective C-rate is equal to a second target C-rate, wherein the second target C-rate corresponds to a third voltage and wherein the second target C-rate is smaller than the first target C-rate.

22. The method of claim 21, further comprising:
terminating the charging of the battery in response to the effective C-rate falling below a fourth target C-rate for a predetermined amount of time, wherein the fourth target C-rate is smaller than the second target C-rate.

* * * * *